US012803702B2

(12) United States Patent
Fan Jiang et al.

(10) Patent No.: US 12,803,702 B2
(45) Date of Patent: Nov. 17, 2026

(54) SIGNAL LOSS COMPENSATION METHOD

(71) Applicant: MEDIATEK INC., Hsin-Chu (TW)

(72) Inventors: Shao-Wei Fan Jiang, Hsinchu City (TW); Chao-Ling Hsu, Hsinchu City (TW); Yiou-Wen Cheng, Hsinchu City (TW)

(73) Assignee: MEDIATEK INC., Hsinchu City (TW)

( * ) Notice: Subject to any disclaimer, the term of this patent is extended or adjusted under 35 U.S.C. 154(b) by 329 days.

(21) Appl. No.: 18/223,040

(22) Filed: Jul. 18, 2023

(65) Prior Publication Data

US 2024/0313886 A1 Sep. 19, 2024

Related U.S. Application Data

(60) Provisional application No. 63/490,802, filed on Mar. 17, 2023.

(51) Int. Cl.
*H04L 1/00* (2006.01)
*G10L 19/005* (2013.01)

(52) U.S. Cl.
CPC .................................. *H04L 1/0033* (2013.01)

(58) Field of Classification Search
None
See application file for complete search history.

(56) References Cited

U.S. PATENT DOCUMENTS 5,907,822 A * 5/1999 Prieto, Jr. ............. G10L 19/005 704/226
7,693,710 B2 * 4/2010 Jelinek .................... G10L 19/00 714/747

(Continued)

FOREIGN PATENT DOCUMENTS

CN 111370006 B * 3/2024 ............. G10L 19/06
EP 3023983 B1 * 10/2017 ........... G10L 19/005

(Continued)

OTHER PUBLICATIONS

Gunduzhan, Emre, and Kathryn Momtahan. "Linear prediction based packet loss concealment algorithm for PCM coded speech." IEEE Transactions on Speech and Audio Processing 9.8 (2001): 778-785. (Year: 2001).*

(Continued)

*Primary Examiner* — Pierre Louis Desir
*Assistant Examiner* — Sean Thomas Smith
(74) *Attorney, Agent, or Firm* — Winston Hsu

(57) ABSTRACT

A signal loss compensation method, for compensating an input signal comprising (K+Y) lost signal units and normal signal units. The signal loss compensation method comprises: compensating 1st to (K−1)th lost signal units by a first signal loss concealment algorithm to generate a first compensation signal and accordingly generating a first synthetic signal; compensating (K+X+1)th to (K+Y) th lost signal units by a second signal loss concealment algorithm to generate a second compensation signal and accordingly generating a second synthetic signal; compensating K th to (K+X)th lost signal units by the first signal loss concealment algorithm or the second signal loss concealment algorithm to generate a third synthetic signal; generating an output signal according to the first synthetic signal, the second synthetic signal, the third synthetic signal and the normal signal units. K and Y are positive integers, X is a natural number, and Y is larger than X.

20 Claims, 11 Drawing Sheets

(56) References Cited

U.S. PATENT DOCUMENTS

| | | | | |
|---|---|---|---|---|
| 8,731,908 | B2 * | 5/2014 | Kapilow | G10L 19/005 704/207 |
| 10,242,679 | B2 * | 3/2019 | Sung | G10L 19/005 |
| 12,380,897 | B2 * | 8/2025 | Pascual | G10L 19/038 |
| 2009/0119098 | A1 * | 5/2009 | Zhan | G10L 19/005 704/E21.001 |
| 2012/0323567 | A1 * | 12/2012 | Gao | G10L 19/09 704/201 |
| 2014/0146695 | A1 * | 5/2014 | Kim | H04L 43/087 370/252 |
| 2014/0222420 | A1 * | 8/2014 | Su | H04L 1/1838 704/201 |
| 2017/0004834 | A1 * | 1/2017 | Schnabel | G10L 19/06 |
| 2019/0122672 | A1 * | 4/2019 | Tomasek | G10L 19/12 |
| 2023/0306980 | A1 * | 9/2023 | Wang | G10L 21/02 |

FOREIGN PATENT DOCUMENTS

| | | | | |
|---|---|---|---|---|
| ES | 2387943 | T3 * | 10/2012 | G10L 19/005 |
| KR | 20210143177 | A * | 11/2021 | H04L 1/0075 |
| SG | 10201700846 | U * | 3/2017 | G10L 19/005 |

OTHER PUBLICATIONS

Fong, William, et al. "Monte Carlo smoothing with application to audio signal enhancement." IEEE transactions on signal processing 50.2 (2002): 438-449. (Year: 2002).*

Ofir, Hadas, David Malah, and Israel Cohen. "Audio packet loss concealment in a combined MDCT-MDST domain." IEEE Signal Processing Letters 14.12 (2007): 1032-1035. (Year: 2007).*

Wang, Dan, and Zhuhong Zhang. "Smoothing Neural Network for Robust Sparse Signal Recovery." 2018 5th IEEE International Conference on Cloud Computing and Intelligence Systems (CCIS). IEEE, 2018. (Year: 2018).*

Zhao, You, et al. "A smoothing neural network for minimization I1-Ip in sparse signal reconstruction with measurement noises." Neural Networks 122 (2020): 40-53. (Year: 2020).*

Wu, Caiying, et al. "Smoothing strategy along with conjugate gradient algorithm for signal reconstruction." Journal of Scientific Computing 87.1 (2021): 21. (Year: 2021).*

* cited by examiner

SIGNAL LOSS COMPENSATION METHOD

CROSS REFERENCE TO RELATED APPLICATIONS

This application claims the benefit of U.S. Provisional Application No. 63/490,802, filed on Mar. 17, 2023. The content of the application is incorporated herein by reference.

BACKGROUND

In recent years, wireless communication between different electronic devices is very popular. However, signal loss, such as packet loss, may happen when an electronic device receives signals from another electronic device. Accordingly, the electronic device which receives signals from another electronic device may use some concealment algorithms to compensate the lost signal. However, the electronic device always uses a single concealment algorithm but different concealment algorithms may have different disadvantages. For example, a weak concealment algorithm (or named a light weight concealment algorithm) consumes less power but could not compensate long continuous signal loss well. On the contrary, a strong concealment algorithm (or named a heavy weight concealment algorithm) can better compensate long continuous signal loss but consumes more power.

Accordingly, a new signal loss compensation method is needed.

SUMMARY

One objective of the present application is to provide a signal loss compensation method which can use more than one signal loss concealment algorithms and has lower power consumption.

Another objective of the present application is to provide a signal smooth method which can improve the discontinuity of signals.

One embodiment of the present application discloses a signal loss compensation method, for compensating an input signal comprising (K+Y) lost signal units and at least one normal signal unit. The signal loss compensation method comprises: compensating 1st to (K−1)th ones of the lost signal units by a first signal loss concealment algorithm to generate a first compensation signal and generating a first synthetic signal according to the first compensation signal; compensating (K+X+1)th to (K+Y)th ones of the lost signal units by a second signal loss concealment algorithm to generate a second compensation signal and generating a second synthetic signal according to the second compensation signal; compensating K th to (K+X)th ones of the lost signal units by at least one of the first signal loss concealment algorithm and a second signal loss concealment algorithm to generate a third synthetic signal; generating an output signal according to the first synthetic signal, the second synthetic signal, the third synthetic signal and the normal signal unit. K and Y are positive integers, X is a natural number, and Y is larger than X. A signal loss concealment ability of the second signal loss concealment algorithm is higher than a signal loss concealment ability of the first signal loss concealment algorithm.

Another embodiment of the present application discloses a signal smooth method, comprising: processing a target signal via a signal loss concealment algorithm to generate a compensation signal, according to a reserved part of the target signal; generating a pseudo signal according to a reference part of the target signal, wherein the reference part comprises the reserved part, and a signal length of the reference part is larger than a signal length of the reserved part; combining the pseudo signal and the target signal to generate a pre-smooth signal; and combining the pre-smooth signal and the compensation signal to generate a smooth signal.

In view of above-mentioned embodiments, the input signal can be compensated by the signal loss compensation method which has a good signal concealment ability while consuming less power. Also, the signal discontinuity can be compensated by the signal smooth method to further increase the efficiency of signal compensation.

These and other objectives of the present invention will no doubt become obvious to those of ordinary skill in the art after reading the following detailed description of the preferred embodiment that is illustrated in the various figures and drawings.

DETAILED DESCRIPTION

Several embodiments are provided in following descriptions to explain the concept of the present invention. Each component in following descriptions can be implemented by hardware (e.g. a device or a circuit) or hardware with software (e.g. a program installed to a processor). Besides, the method in following descriptions can be executed by programs stored in a non-transitory computer readable recording medium such as a hard disk, an optical disc or a memory. Additionally, the term “first”, “second”, “third” in following descriptions are only for the purpose of distinguishing different one elements, and do not mean the sequence of the elements. For example, a first device and a second device only mean these devices can have the same structure but are different devices.

Also, in following embodiments, an audio signal is used as an example for explaining. However, the audio signal can be replaced by any other type of signal. Further, packets are used as an example for explaining. However, the packets can be replaced by any other signal unit.

Figure 1:
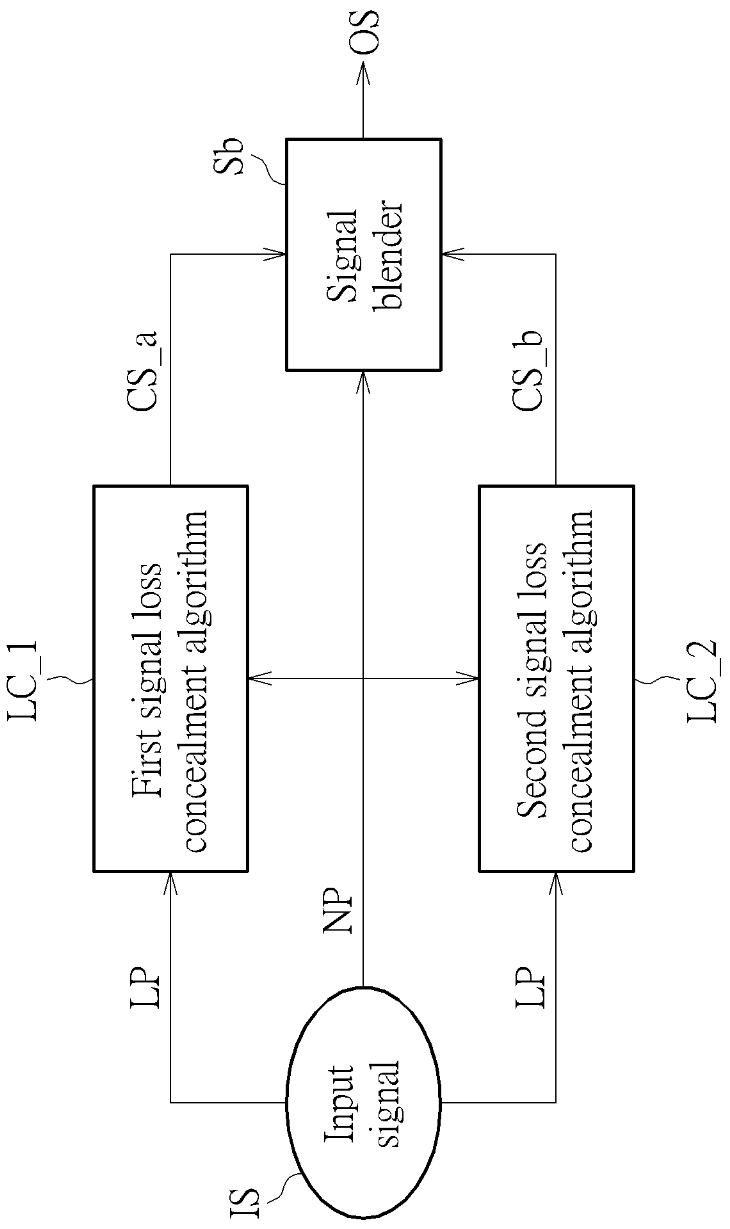
FIG. 1 is a schematic diagram illustrating a signal compensation method according to one embodiment of the present application.

FIG. 1 is a schematic diagram illustrating a signal compensation method according to one embodiment of the present application. An input signal IS, which is transmitted from a source device to a target device, comprises lost packets LP and normal packets NP. The lost packets LP mean the packets which are sent by the source device but not received by the target device. On the opposite, the normal packets NP mean the packets are sent by the source device and received by the target device. At least portion of the lost packets LP is processed by the first signal loss concealment algorithm (first SLC algorithm herein after) LC_1 to generate the compensation signal CS_a. Also, at least portion of the lost packets LP is processed by the second signal loss concealment algorithm (second SLC algorithm herein after) LC_2 to generate the compensation signal CS_b. The signal blender Sb generates an output signal OS according to the normal packets NP and according to at least one of the compensation signal CS_a and the compensation signal CS_b.

In one embodiment, a packet loss concealment ability of the second SLC algorithm LC_2 is higher than a packet loss concealment ability of the first SLC algorithm LC_1. Accordingly, the first SLC algorithm LC_1 can be regarded as a light weight packet loss concealment and the second SLC algorithm LC_2 can be regarded as a heavy weight packet loss concealment. In such case, a power consumption of the second SLC algorithm LC_2 is higher than a power consumption of the first SLC algorithm LC_1.

In one embodiment, the first SLC algorithm LC_1 may be an insertion method or a prediction method. The insertion method may be zero-filling and packet reception. For zero-filling, each lost packet is filled with silence signal, as for packet repetition each lost packet would repeat the previous normal packet. The prediction method may be a Pitch-based method or a Linear Prediction method. For Pitch-based method, each lost packet computes pitch period first then output the specific pitch period signal from the previous packet. As for Linear Prediction method, each lost packet uses Linear Prediction Filter Coefficients to synthesize lost packets. Also, in one embodiment, the second SLC algorithm LC_2 may be a neural-network based PLC models, such as WaveRNN, U-Net or Generative Adversarial Network (GAN) based model. However, the first SLC algorithm LC_1 and the second SLC algorithm LC_2 are not limited to these examples.

Figure 2:
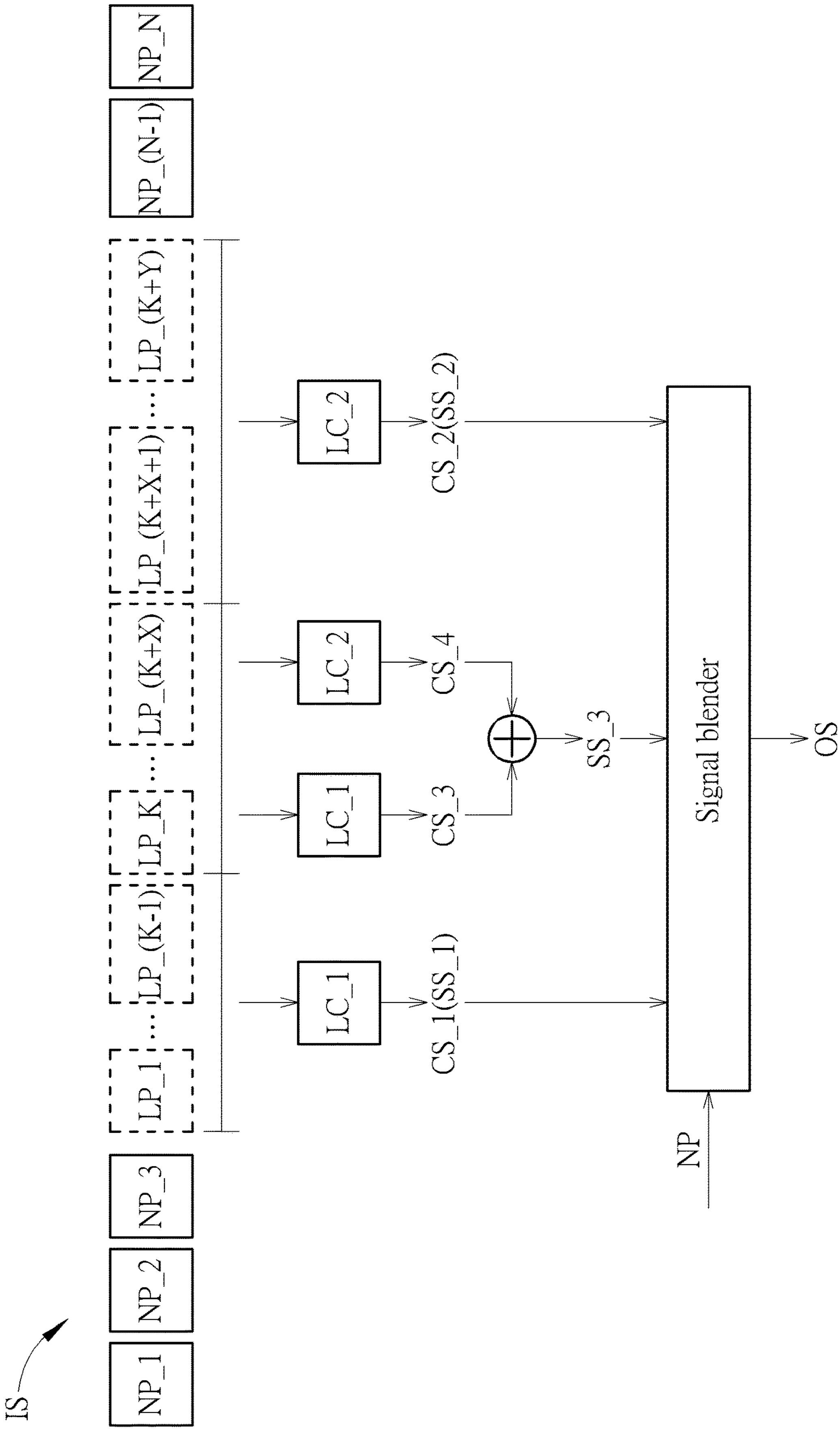
FIG. 2, FIG. 3 and FIG. 4 are schematic diagrams illustrating more detail steps of the signal compensation method, according to different embodiments of the present application.
Figure 3:
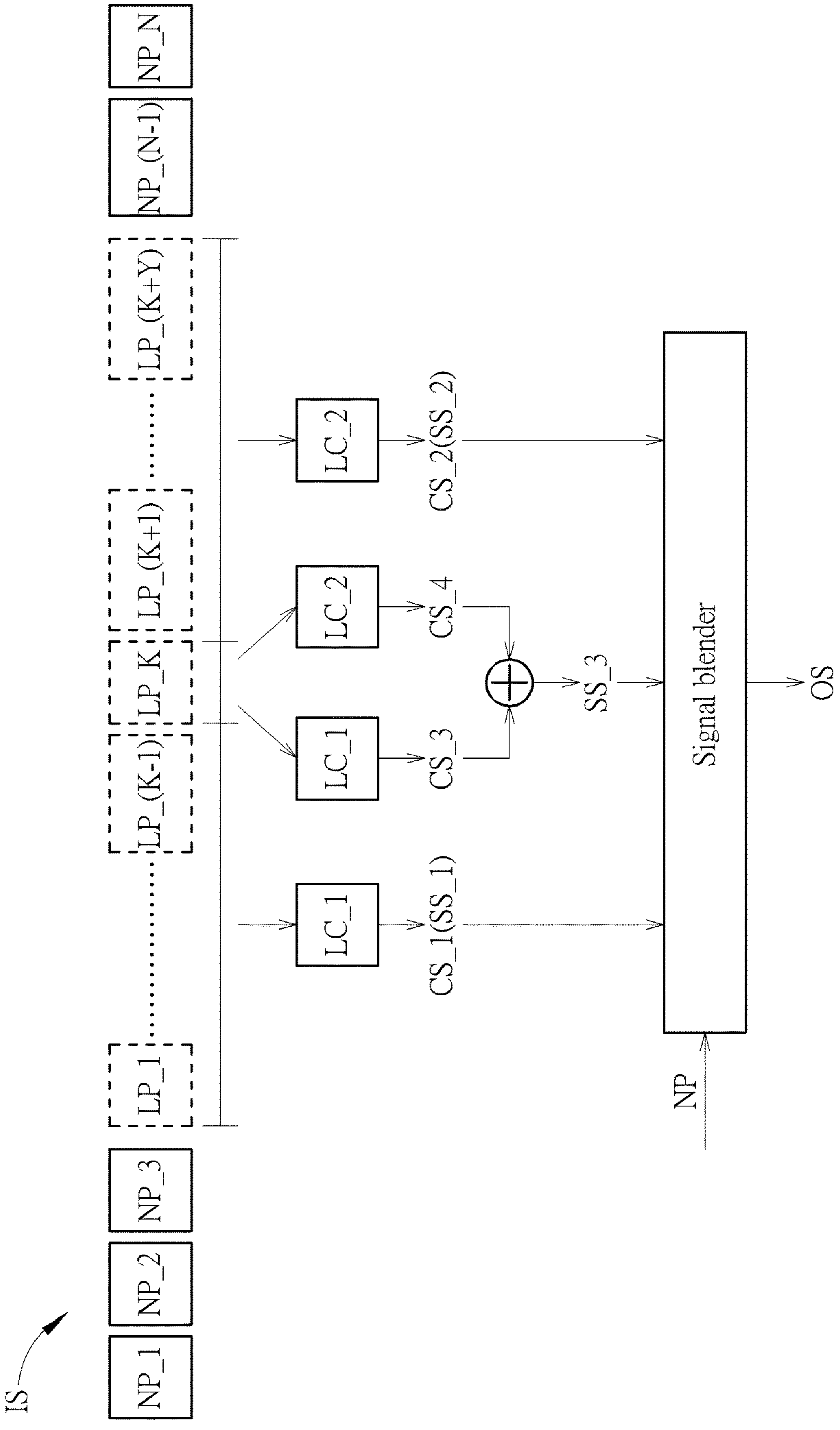

Detail steps of the signal compensation method in FIG. 1 will be described below. FIG. 2, FIG. 3 are schematic diagrams illustrating more detail steps of the signal compensation method, according to different embodiments of the present application. In the embodiment of FIG. 2, the original input signal output from the source device has N normal packets NP_1, NP_2 . . . NP_N. However, some packets are lost during the transmission or the reception. Accordingly, the input signal IS which is received by the target device comprises (K+Y) lost packets, which are represented by dotted lines. In such case, the normal packets of the input signal IS are represented by solid lines.

In the embodiment of FIG. 2, the 1st lost packet LP_1 to the (K−1)th lost packet LP_(K−1) are compensated by the first SLC algorithm LC_1 to generate a first compensation signal CS_1. Also, a first synthetic signal SS_1 is generated according to the first compensation signal CS_1. In the embodiment of FIG. 1, the first compensation signal CS_1 is directly used as the first synthetic signal SS_1. Similarly, the (K+X+1)th lost packet LP_(K+X+1) to the (K+Y)th lost packet LP_(K+Y) are compensated by the second SLC algorithm LC_2 to generate a second compensation signal CS_2. Also, a second synthetic signal SS_2 is generated according to the second compensation signal CS_2. In the embodiment of FIG. 1, the second compensation signal CS_2 is directly used as the second synthetic signal SS_2.

Besides, in the embodiment of FIG. 2, the K th lost packet LP_K to the (K+X)th lost packet LP_(K+X) are compensated by the first SLC concealment algorithm LC_1 to generate a third compensation signal CS_3, and compensated by the second SLC concealment algorithm LC_2 to generate a fourth compensation signal CS_4. After that, a third synthetic signal SS_3 is generated according to the third compensation signal CS_3 and the fourth compensation signal CS_4. In one embodiment, the third compensation signal CS_3 and the fourth compensation signal CS_4 are added to generate the third synthetic signal SS_3, as shown in FIG. 2. In other words, the third synthetic signal SS_3 is a combination of the third compensation signal CS_3 and the fourth compensation signal CS_4. The above-mentioned K and Y are positive integers (e.g., 1, 2, 3, 4 . . . ), X is a natural number (e.g., 0, 1, 2, 3 . . . ), and Y is larger than X. Values of K, X and Y can be set corresponding to different requirements. For example, K, X and Y can be set corresponding to a required signal compensation level or a required power consumption rate.

Next, the signal blender Sb generates an output signal OS according to the first synthetic signal SS_1, the second synthetic signal SS_2, the third synthetic signal SS_3 and the normal packets. Specifically, in one embodiment, the first synthetic signal SS_1, the second synthetic signal SS_2, the third synthetic signal SS_3 are used to fill the locations of the lost packets. Accordingly, in such case, the output signal OS is a signal which comprises the normal packets NP of the input signal IS and the packets corresponding to the first synthetic signal SS_1, the second synthetic signal SS_2, and the third synthetic signal SS_3.

Please note, the scope of the present application is not limited to the embodiment of FIG. 2. In one embodiment, the K th lost packet LP_K to the (K+X)th lost packet LP_(K+X) can be processed by only one of the first SLC algorithm LC_1 and the second SLC algorithm LC_2, to generate the third synthetic signal SS_3. For example, the K th lost packet LP_K to the (K+X)th lost packet LP_(K+X) are processed by the first SLC algorithm LC_1 but not processed by the second SLC algorithm LC_2, to generate the third synthetic signal SS_3. In such case, the third synthetic signal SS_3 can be regarded as a portion of the first synthetic signal SS_1. For another example, the K th lost packet LP_K to the (K+X)th lost packet LP_(K+X) are processed by the second SLC algorithm LC_2 but not processed by the first SLC algorithm LC_1, to generate the third synthetic signal SS_3. In such case, the third synthetic signal SS_3 can be regarded as a portion of the second synthetic signal SS_2.

Based upon the embodiments illustrated in FIG. 1 and FIG. 2, the signal compensation method can consume less power while maintaining a good signal compensation ability, since two signal loss concealment algorithms with different concealment abilities and power consumption rates are used. It will be appreciated that the present application is not limited to use two signal loss concealment algorithms.

As above-mentioned, X can be a natural number. Accordingly, in the embodiment of FIG. 3, X is 0, which means only one lost packet LP_K is compensated by at least one of the first SLC algorithm LC_1 and the second SLC algorithm LC_2.

In the embodiment of FIG. 3, the K th lost packet LP_K is compensated by the first SLC concealment algorithm LC_1 to generate a third compensation signal CS_3, and compensated by the second SLC concealment algorithm LC_2 to generate a fourth compensation signal CS_4. After that, a third synthetic signal SS_3 is generated according to the third compensation signal CS_3 and the fourth compensation signal CS_4. In one embodiment, the third compensation signal CS_3 and the fourth compensation signal CS_4 are added to generate the third synthetic signal SS_3, as shown in FIG. 3. In other words, the third synthetic signal SS_3 is a combination of the third compensation signal CS_3 and the fourth compensation signal CS_4. The steps of compensating the 1st lost packet LP_1 to the (K−1)th lost packet LP_(K−1) and the (K+1)th lost packet LP_(K+1) to the (K+Y) th lost packet LP_(K+Y) may be the same as the steps of compensating the 1st lost packet LP_1 to the (K−1)th lost packet LP_(K−1) and the (K+X+1)th lost packet LP_(K+X+1) to the (K+Y)th lost packet LP_(K+Y) illustrated in FIG. 2, thus are omitted for brevity here.

Besides, following the rule depicted in FIG. 2, the K th lost packet LP_K can be processed by only one of the first SLC algorithm LC_1 and the second SLC algorithm LC_2, to generate the third synthetic signal SS_3. For example, the K th lost packet LP_K is processed by the first SLC algorithm LC_1 but not processed by the second SLC algorithm LC_2, to generate the third synthetic signal SS_3. In such case, the third synthetic signal SS_3 can be regarded as a portion of the first synthetic signal SS_1. For another example, the K th lost packet LP_K is processed by the second SLC algorithm LC_2 but not processed by the first SLC algorithm LC_1, to generate the third synthetic signal SS_3. In such case, the third synthetic signal SS_3 can be regarded as a portion of the second synthetic signal SS_2.

In one embodiment, the first synthetic signal SS_1 can be generated according the first compensation signal CS_1 and another signal. For example, in the embodiment of FIG. 4, a signal smoother 401 is further comprised, to perform a signal smooth method for generating the first synthetic signal SS_1 according to a target part NP_TP of the normal packets NP, which is shown in FIG. 5, and the first compensation signal CS_1. In one embodiment, the target part NP_TP is previous to the 1st lost packet LP_1. FIG. 5 is a block diagram illustrating the signal smoother 401 illustrated in FIG. 4, according to one embodiment of the present application. As shown in FIG. 5, the signal smoother 401 comprises a pseudo signal generator 501, a pre-smoother 503 and a post-smoother 505. The pseudo signal generator 501, the pre-smoother 503 and the post-smoother 505 can be implemented by hardware or software. The hardware can be, for example, a circuit or a device. The software can be programs which can be executed by a circuit such as a processor.

The pseudo signal generator 501 generates a pseudo signal PS according to a reference part of the target part NP_TP. The reference part comprises a reserved part of the target part NP_TP. In one embodiment, a signal length of the reference part is larger than a signal length of the reserved part, but not limited. The pre-smoother 503 combines the pseudo signal PS and the target part NP_TP to generate a pre-smooth signal Pres. Details of the reference part, the reserved part and the target part NP_TP will be described later. The post-smoother 505 combines the pre-smooth signal Pres and the first compensation signal CS to generate a portion of the output signal OS. For example, the post-smoother 505 combines the pre-smooth signal Pres and the first compensation signal CS to generate a portion of the first synthetic signal SS_1. In one embodiment, the first signal loss concealment algorithm LC_1 generates the first compensation signal CS_1 according to the reserved part RE, but not limited.

Figure 5:
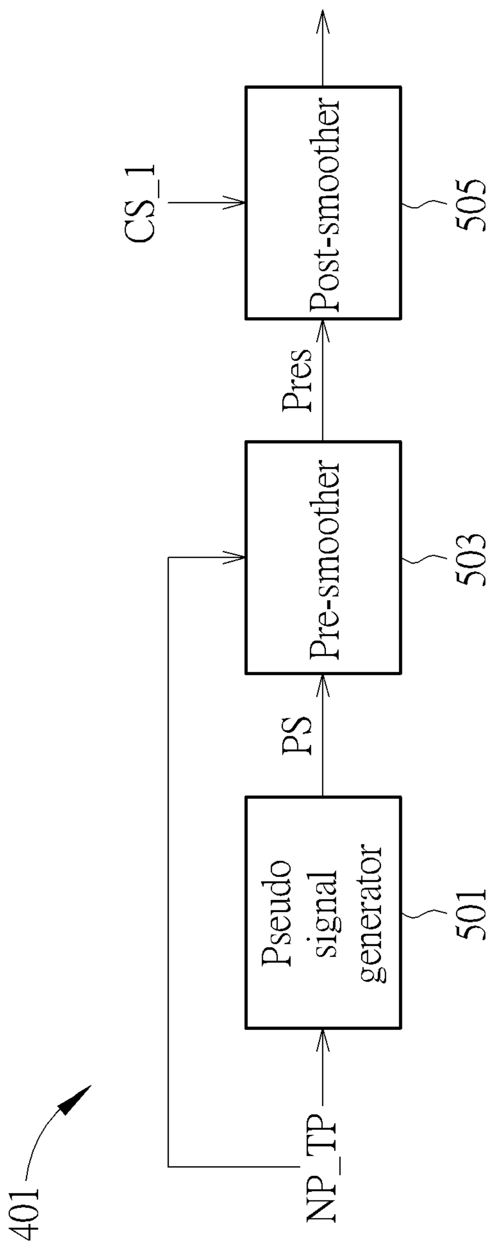
FIG. 5 is a block diagram illustrating the signal smoother illustrated in FIG. 4, according to one embodiment of the present application.
Figure 6:
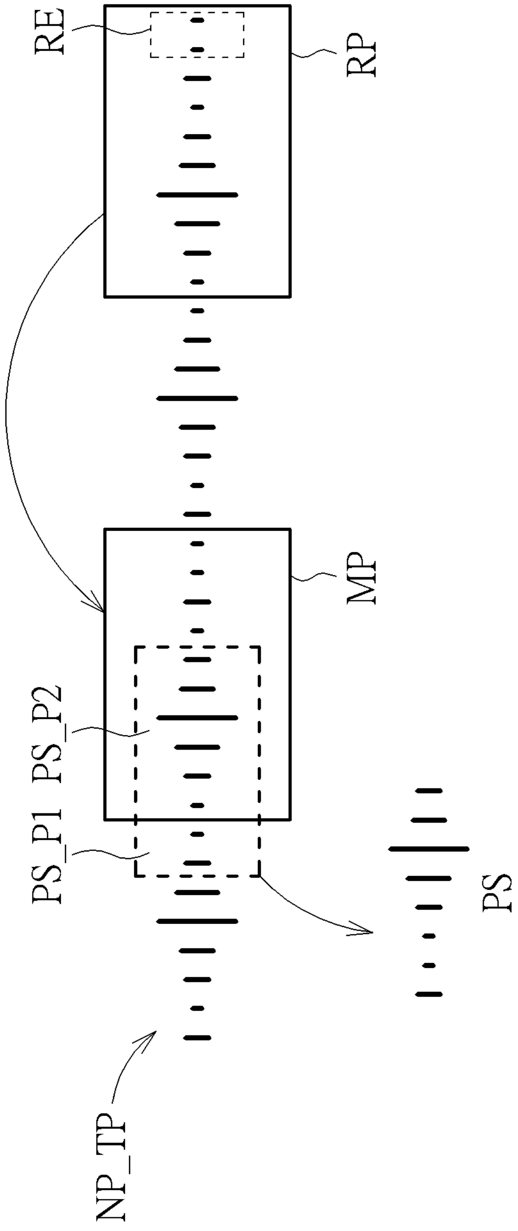
FIG. 6 and FIG. 7 are schematic diagrams illustrating operations of the pseudo signal generator illustrated in FIG. 5, according to embodiments of the present application.

FIG. 6 is a schematic diagram illustrating operations of the pseudo signal generator 501 illustrated in FIG. 5, according to embodiments of the present application. In following embodiments, each small bar indicates a packet, for example, the reserved part RE comprises two packets and the pseudo signal PS has eight packets. As illustrated in FIG. 6, the reference part RP is defined, and the match part MP of the target part NP_TP is searched according to the reference part RP. The signal characteristics of the match part MP matches signal characteristics of the reference part RP. For example, the signal wave of the match part MP matches the signal wave of the reference part RP. The searching of the match part MP may be implemented by various methods. For example, the searching of the match part MP may be performed via a phase alignment such as auto correlation. Afterwards, the pseudo signal PS is generated according to the match part MP. In one embodiment, a length of the reference part RP is longer than a length of the pseudo signal PS. Also, the reference part RP comprises the above-mentioned reserved part RE. However, generation of the pseudo signal PS is not limited to these examples. Also, the pseudo signal PS may be generated by other methods, for example, by an NN based generative model.

In one embodiment, the pseudo signal PS comprises a first pseudo part PS_P1 and a second pseudo part PS_P2 following the first pseudo part PS_P1, wherein a length of the first pseudo part PS_P1 is identical with a length of the reserved part RE. In the embodiment of FIG. 6, the first pseudo part PS_P1 is not comprised in the match part MP and is previous to the match part MP, and the second pseudo part PS_P2 is comprised in the match part MP. Packets of the original input signal output by the source device may periodically appear. Accordingly, the signal wave of the second pseudo part PS_P2 in FIG. 6 may appear following the reserved part RE. Thus, the input signal IS may be better compensated if the pseudo signal PS comprises the first pseudo part PS_P1 which corresponds to the reserved part RE and is previous to the portion of the match part MP P.

The arrangement of the first pseudo part PS_P1 and the second pseudo part PS_P2 is not limited to the example illustrated in FIG. 6. For example, in the embodiment of FIG. 7, the first pseudo part PS_P1 is comprised in the match part MP, but the second pseudo part PS_P2 is not comprised in the match part MP and follows the match part MP. The rules explained in FIG. 6 can be applied to the embodiment of FIG. 7 as well. For example, a length of the first pseudo part PS_P1 is identical with a length of the reserved part RE.

Figure 4:
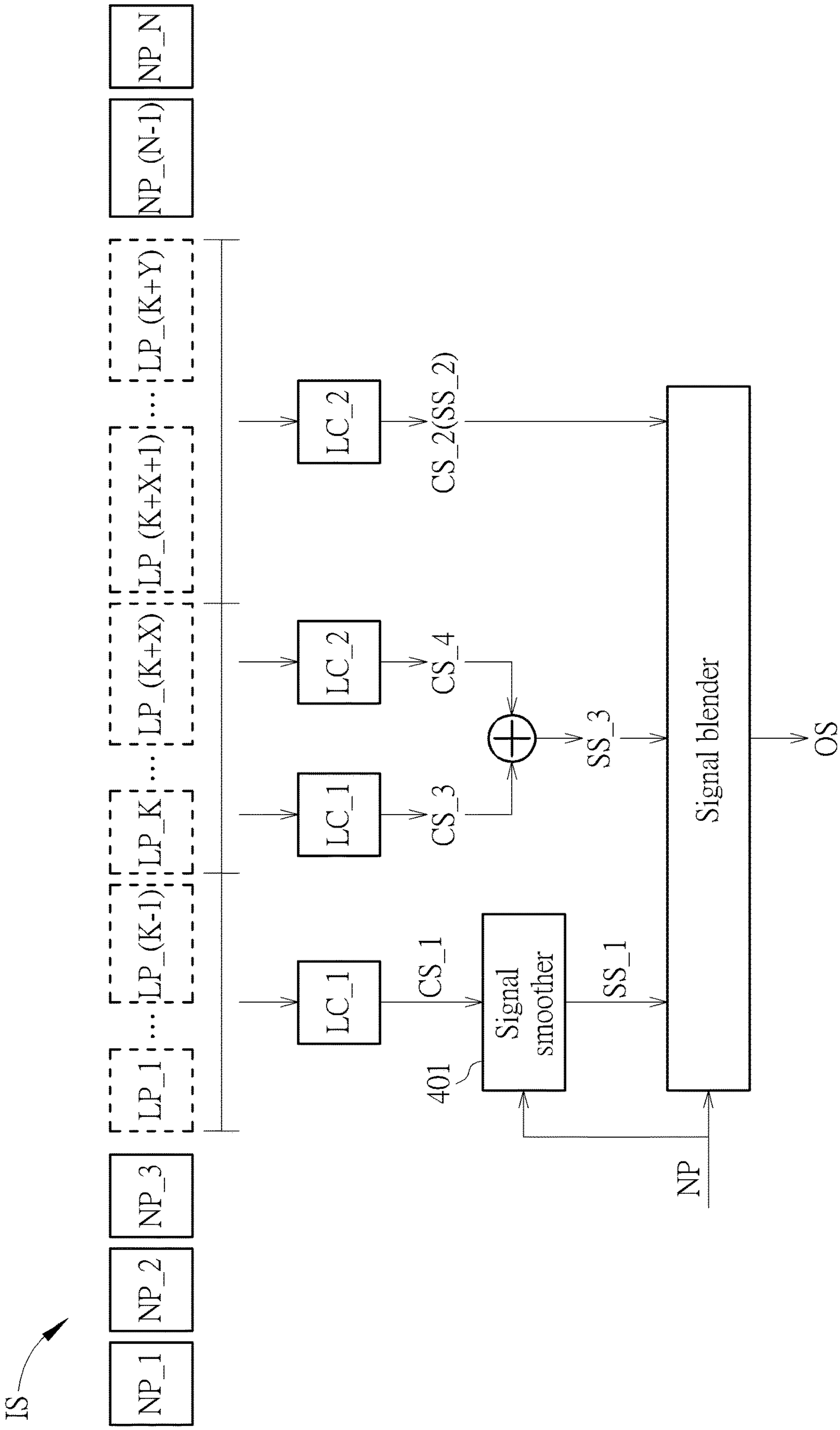
Figure 8:
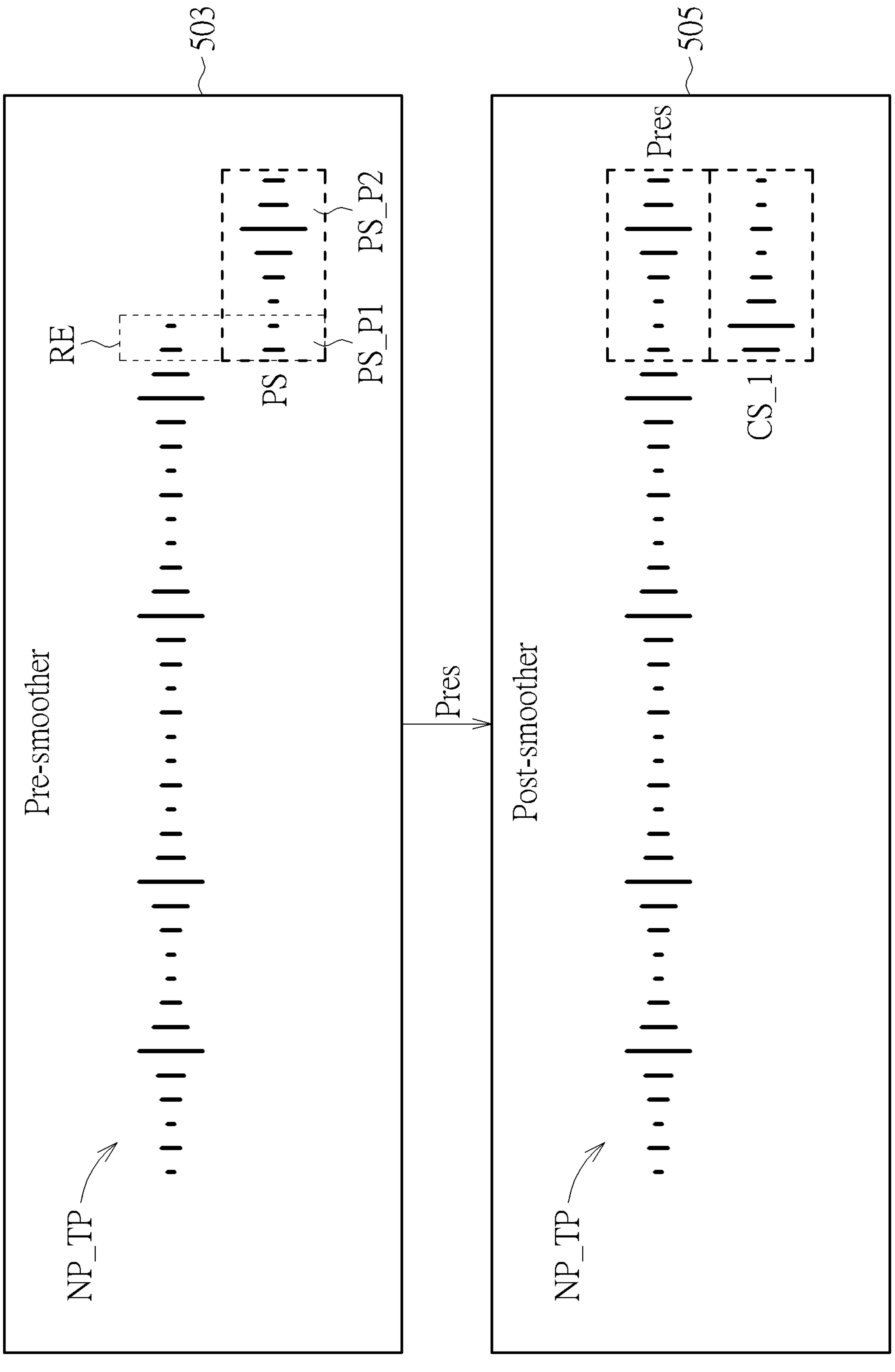
FIG. 8 is a schematic diagram illustrating operations of the signal smoother illustrated in FIG. 4, according to embodiments of the present application.

FIG. 8 is a schematic diagram illustrating operations of the signal smoother illustrated in FIG. 4, according to embodiments of the present application. As shown in FIG. 8, the pre-smoother 503 combines the target part NP_TP with the pseudo signal PS to generate the pre-smooth signal Pres. In one embodiment, the pre-smoother 503 combines the second pseudo part PS_P2 with the target part NP_TP, since the first pseudo part PS_P1 and the reserved part RE may have the same signal. Next, the post-smoother 505 combines the pre-smooth signal Pres with the first compensation signal CS_1, to generate a portion of the output signal OS. In such case, the above-mentioned first synthetic signal SS_1 can be regarded as a combination of the pseudo signal PS and the first compensation signal CS_1. Accordingly, the first synthetic signal SS_1 can be regarded as a signal generated according to the target part NP_TP and the first compensation signal CS_1, since the pseudo signal PS is generated according to the target part NP_TP. By this way, since the pseudo signal PS, which is generated according to the target part NP_TP, can be used as a bridge between the target part NP_TP and the first compensation signal CS_1, the discontinuity of the output signal OS can be improved even if a length of the reserved part RE is short but a length of the lost packets LP is long.

Figure 9:
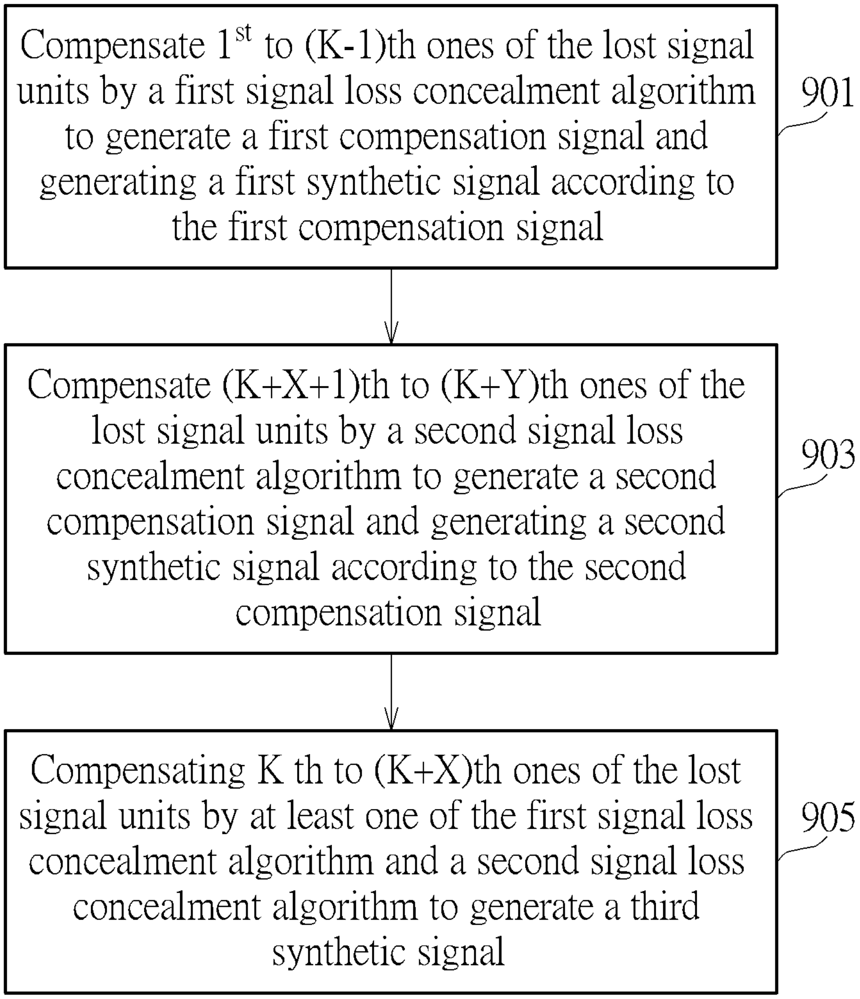
FIG. 9 is a flow chart illustrating a signal compensation method according to one embodiment of the present application.

In view of above-mentioned embodiments, a signal compensation method can be acquired, which is for compensating an input signal comprising (K+Y) lost signal units (e.g., lost packets) and at least one normal signal unit (e.g., normal packets). The method comprises following steps of FIG. 9:

Step 901

Compensate 1st to (K−1)th ones of the lost signal units by a first signal loss concealment algorithm (e.g., first SLC algorithm LC_1) to generate a first compensation signal (e.g., the first compensation signal CS_1) and generating a first synthetic signal (e.g., the first synthetic signal SS_1) according to the first compensation signal.

Step 903

Compensate (K+X+1)th to (K+Y)th ones of the lost signal units by a second signal loss concealment algorithm (e.g., second SLC algorithm LC_2) to generate a second compensation signal (e.g., the second compensation signal CS_2) and generating a second synthetic signal (e.g., the second synthetic signal SS_2) according to the second compensation signal.

Step 905

Compensating K th to (K+X)th ones of the lost signal units by at least one of the first signal loss concealment algorithm and a second signal loss concealment algorithm to generate a third synthetic signal (e.g., the third compensation signal CS_3).

K and Y are positive integers, X is a natural number, and Y is larger than X. A signal loss concealment ability of the second signal loss concealment algorithm is higher than a signal loss concealment ability of the first signal loss concealment algorithm. Other detail steps can be acquired in view of above-mentioned embodiments, thus are omitted for brevity here.

Figure 10:
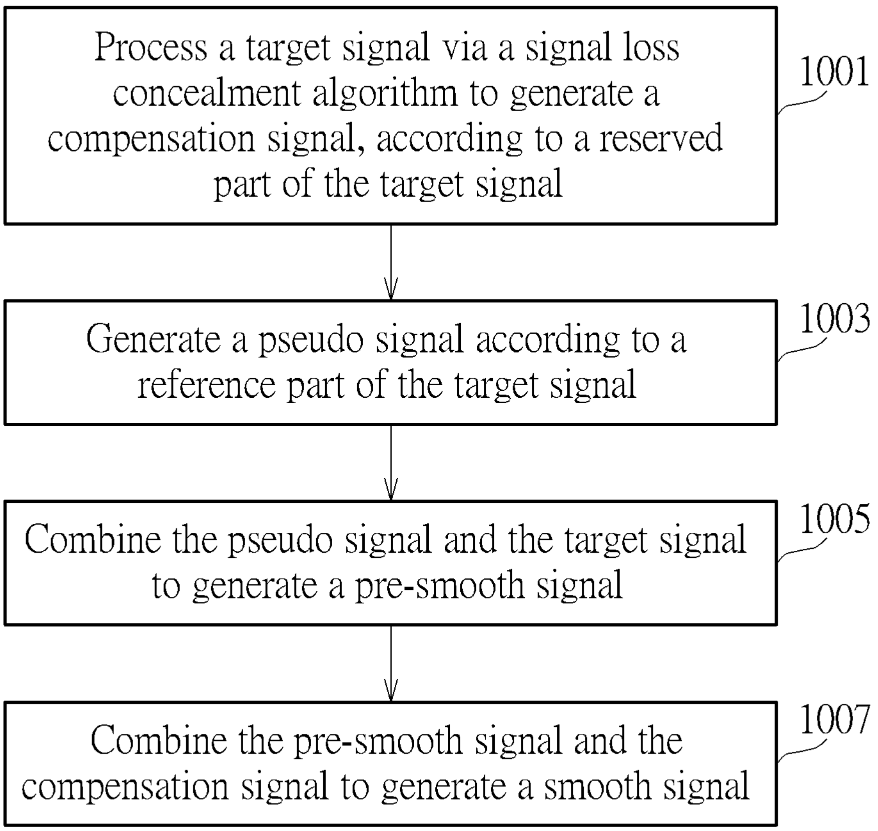
FIG. 10 is a flow chart illustrating a signal smooth method according to one embodiment of the present application.

The signal smoother 401 disclosed in above-mentioned embodiments can be used to process any other signal rather than the signals illustrated in FIG. 4. Accordingly, a signal smooth method can be acquired in view of above-mentioned embodiments, which comprises following steps of FIG. 10:

Step 1001

Process a target signal via a signal loss concealment algorithm to generate a compensation signal, according to a reserved part of the target signal.

In the embodiment of FIG. 4, the target signal is the target part NP_TP, but the target signal can be from any other signal source. Also, in the embodiment of FIG. 4, the signal loss concealment algorithm is the first SLC algorithm LC_1 and the compensation signal is the first compensation signal CS_1. However, the signal loss concealment algorithm can be any other algorithm.

Step 1003

Figure 7:
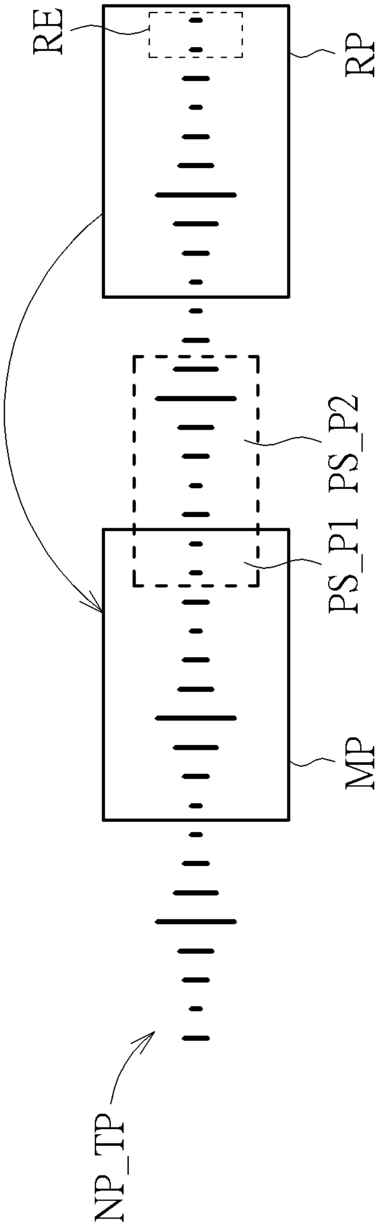

Generate a pseudo signal according to a reference part of the target signal, such as the embodiments illustrated in FIG. 6 and FIG. 7.

The reference part comprises the reserved part, and a signal length of the reference part is larger than a signal length of the reserved part Step 1005

Combine the pseudo signal and the target signal to generate a pre-smooth signal.

Step 1007

Combine the pre-smooth signal and the compensation signal to generate a smooth signal.

The operations of the steps 1005 and 1007 can be, for example, the operations illustrated in FIG. 8.

Figure 11:
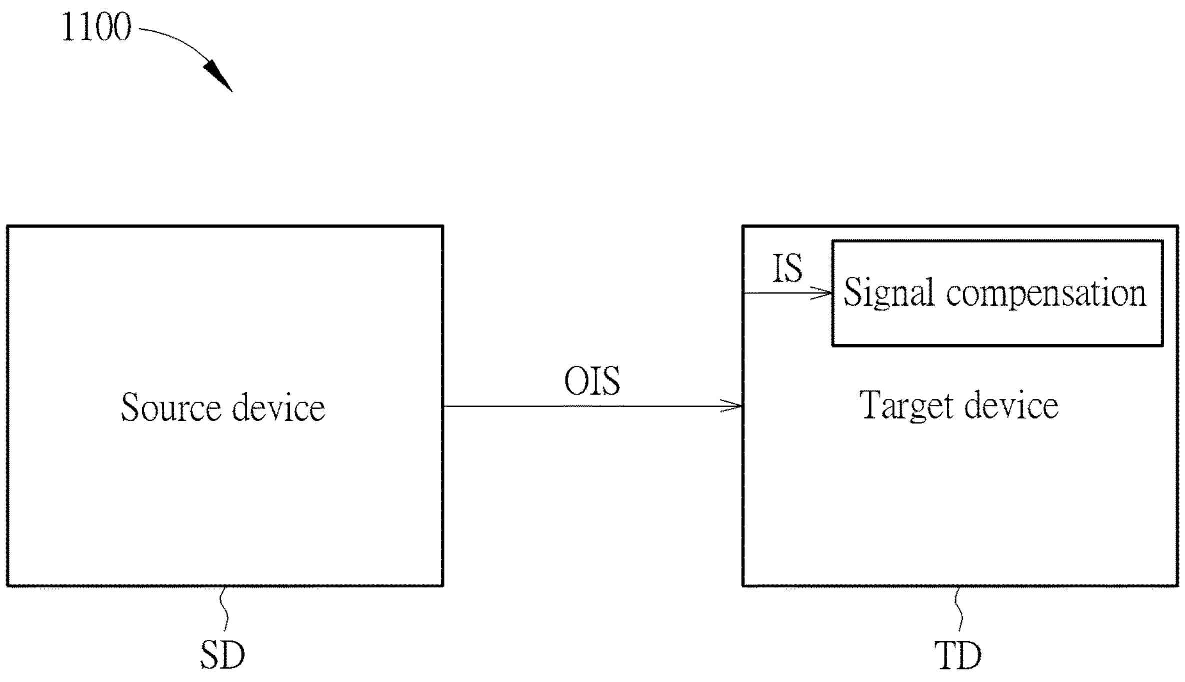
FIG. 11 is a block diagram illustrating an electronic system applying the signal compensation method according to one embodiment of the present application.

As above-mentioned, an original input signal can be transmitted from a source device to a target device, and the above-mentioned input signal IS is the signal which the target device really receives. FIG. 11 is a block diagram illustrating an electronic system 1100 applying the signal compensation method according to one embodiment of the present application. As illustrated in FIG. 11, the electronic system 1100 comprises a source device SD and a target device TD. The source device SD sends an original input signal OIS to the target device TD. The signal which the target device TD really receives is the input signal IS. Some packets of the input signal IS may be lost during transmitting or receiving. Accordingly, the input signal IS may be compensated based on the above-mentioned embodiments.

The target device TD may acquire information related with the lost packets LP via various methods. For example, the source device SD may transmit a list to inform the target device TD how many packets should be received and the sequence of the packets in the original input signal OIS, thus the target device TD may acquire the information of the lost packets LP. However, the method of acquire information related with the lost packets LP may be changed corresponding the communication algorithm (wireless or wired) between the source device SD and the target device TD.

In one embodiment, the original input signal OIS may be an audio signal. In such case, the source device SD may be an audio source such as a computer or a mobile phone, and the target device TD may be a device which can play the audio signals, such as an earphone or a speaker. Via the above-mentioned signal compensation method, the user which uses the target device TD may have a better user experience since the lost packets are compensated and the signal discontinuity may be improved. However, the original input signal OIS and the input signal IS may be any other type of signals.

In view of above-mentioned embodiments, the input signal can be compensated by the signal loss compensation method which has a good signal concealment ability while consuming less power. Also, the signal discontinuity can be compensated by the signal smooth method to further increase the efficiency of signal compensation.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A signal loss compensation method, for compensating an input signal received by a target device, the input signal comprising (K+Y) lost signal units and at least one normal signal unit, the method performed by a signal compensation module of the target device and comprising:

compensating $1^{st}$ to (K−1) th ones of the lost signal units by a first signal loss concealment algorithm to generate a first compensation signal and generating a first synthetic signal according to the first compensation signal;

compensating (K+X+1) th to (K+Y) th ones of the lost signal units by a second signal loss concealment algorithm to generate a second compensation signal and generating a second synthetic signal according to the second compensation signal;

compensating K th to (K+X) th ones of the lost signal units by at least one of the first signal loss concealment algorithm and the second signal loss concealment algorithm to generate a third synthetic signal;

generating an output signal according to the first synthetic signal, the second synthetic signal, the third synthetic signal and the normal signal unit;

wherein K and Y are positive integers, X is a natural number, and Y is larger than X;

wherein a signal loss concealment ability of the second signal loss concealment algorithm is higher than a signal loss concealment ability of the first signal loss concealment algorithm, and a power consumption of the second signal loss concealment algorithm is higher than a power consumption of the first signal loss concealment algorithm.

2. The signal loss compensation method of claim 1, wherein the step of compensating K th to (K+X) th ones of the lost signal units comprises:

compensating the K th to (K+X) th ones of the lost signal units by the first signal loss concealment algorithm to generate a third compensation signal, and compensating the K th to the (K+X)th ones of the lost signal units by the second signal loss concealment algorithm to generate a fourth compensation signal;

generating the third synthetic signal according to the third compensation signal and the fourth compensation signal.

3. The signal loss compensation method of claim 2, further comprising:

adding the third compensation signal and the fourth compensation signal, to generate the third synthetic signal.

4. The signal loss compensation method of claim 1, wherein X is 0.

5. The signal loss compensation method of claim 1, further comprising:

performing a signal smooth method, to generate the first synthetic signal according to a target part of the normal signal unit and the first compensation signal, wherein the target part is previous to the 1st lost signal unit.

6. The signal loss compensation method of claim 5, wherein the signal smooth method comprises:

generating a pseudo signal according to a reference part of the target part, wherein the reference part comprises a reserved part, wherein the step of generating the output signal comprises:

combining the pseudo signal and the target part to generate a pre-smooth signal; and combining the pre-smooth signal and the first compensation signal to generate a portion of the output signal.

7. The signal loss compensation method of claim 6, wherein a signal length of the reference part is larger than a signal length of the reserved part.

8. The signal loss compensation method of claim 6, wherein the step of generating the pseudo signal comprises:

searching a match part of the target part according to the reference part, wherein signal characteristics of the match part matches signal characteristics of the reference part; and generating the pseudo signal according to the match part.

9. The signal loss compensation method of claim 8, wherein the pseudo signal comprises a first pseudo part and a second pseudo part following the first pseudo part.

10. The signal loss compensation method of claim 9, wherein the first pseudo part is not comprised in the match part and is previous to the match part, and the second pseudo part is comprised in the match part.

11. The signal loss compensation method of claim 9, wherein the first pseudo part is comprised in the match part, the second pseudo part is not comprised in the match part and follows the match part.

12. The signal loss compensation method of claim 9, wherein a length of the first pseudo part is identical with a length of the reserved part.

13. The signal loss compensation method of claim 6, wherein a length of the reference part is longer than a length of the pseudo signal.

14. A target device, for compensating an input signal received by the target device, the input signal comprising (K+Y) lost signal units and at least one normal signal unit, the target device comprising:

a signal compensation module, configured to:

compensate 1st to (K-1)th ones of the lost signal units by a first signal loss concealment algorithm to generate a first compensation signal and generate a first synthetic signal according to the first compensation signal;

compensate (K+X+1)th to (K+Y) th ones of the lost signal units by a second signal loss concealment algorithm to generate a second compensation signal and generate a second synthetic signal according to the second compensation signal;

compensate K th to (K+X)th ones of the lost signal units by at least one of the first signal loss concealment algorithm and the second signal loss concealment algorithm to generate a third synthetic signal; and generate an output signal according to the first synthetic signal, the second synthetic signal, the third synthetic signal and the normal signal unit;

wherein K and Y are positive integers, X is a natural number, and Y is larger than X;

wherein a signal loss concealment ability of the second signal loss concealment algorithm is higher than a signal loss concealment ability of the first signal loss concealment algorithm, and a power consumption of the second signal loss concealment algorithm is higher than a power consumption of the first signal loss concealment algorithm.

15. The target device of claim 14, wherein the signal compensation module is further configured to:

compensate the K th to (K+X)th ones of the lost signal units by the first signal loss concealment algorithm to generate a third compensation signal, and compensate the K th to the (K+X)th ones of the lost signal units by the second signal loss concealment algorithm to generate a fourth compensation signal; and generate the third synthetic signal according to the third compensation signal and the fourth compensation signal.

16. The target device of claim 15, wherein the signal compensation module is further configured to:

add the third compensation signal and the fourth compensation signal, to generate the third synthetic signal.

17. The target device of claim 14, the signal compensation module further comprising:

a signal smoother, configured to perform a signal smooth method, to generate the first synthetic signal according to a target part of the normal signal unit and the first compensation signal, wherein the target part is previous to the first lost signal unit.

18. The target device of claim 17, wherein the signal smoother comprises a pseudo signal generator, a pre-smoother and a post-smoother, wherein:

the pseudo signal generator is configured to generate a pseudo signal according to a reference part of the target part, wherein the reference part comprises a reserved part;

the pre-smoother is configured to combine the pseudo signal and the target part to generate a pre-smooth signal; and the post-smoother is configured to combine the pre-smooth signal and the first compensation signal to generate a portion of the output signal.

19. The target device of claim 18, wherein the pseudo signal generator is further configured to:

search a match part of the target part according to the reference part, wherein signal characteristics of the match part matches signal characteristics of the reference part; and generate the pseudo signal according to the match part.

20. The target device of claim 19, wherein the pseudo signal comprises a first pseudo part and a second pseudo part following the first pseudo part.

* * * * *